L. MORDANO.
DIFFERENTIAL GEARING FOR AUTOMOBILES, &c.
APPLICATION FILED JUNE 14, 1920.

1,370,701.

Patented Mar. 8, 1921.
2 SHEETS—SHEET 1.

Inventor:
LEONARD MORDANO,
By his Attorney,

L. MORDANO.
DIFFERENTIAL GEARING FOR AUTOMOBILES, &c.
APPLICATION FILED JUNE 14, 1920.
1,370,701.
Patented Mar. 8, 1921.
2 SHEETS—SHEET 2.
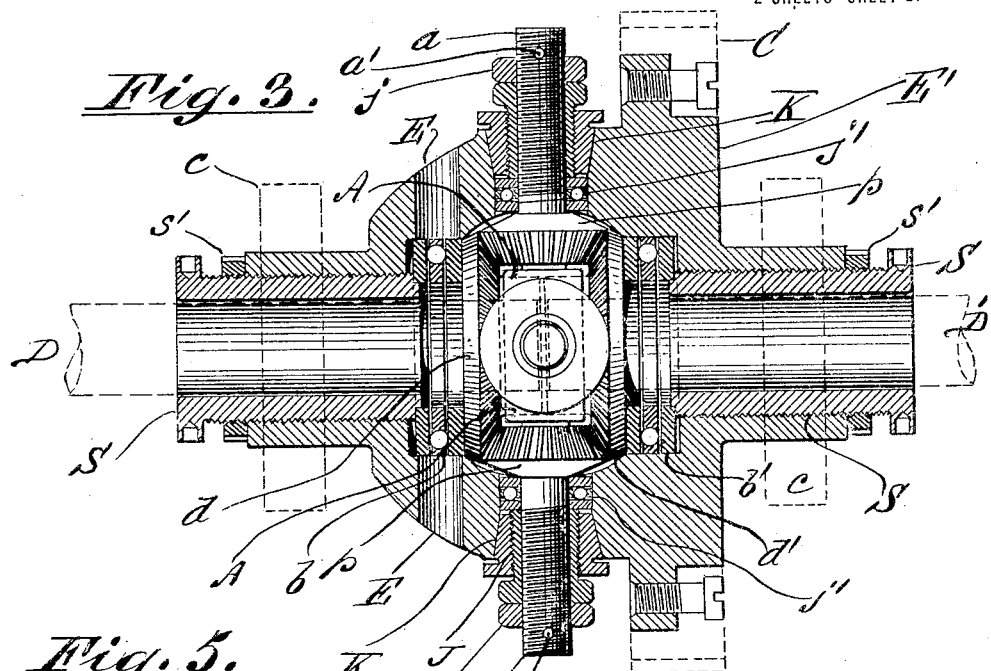
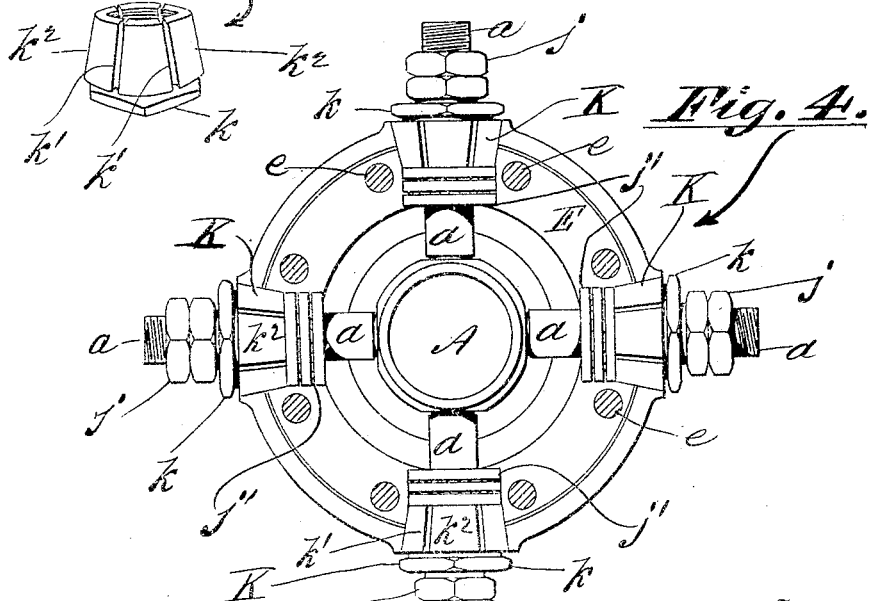
Inventor:
LEONARD MORDANO,
By his Attorney

UNITED STATES PATENT OFFICE.

LEONARD MORDANO, OF NEW YORK, N. Y.

DIFFERENTIAL GEARING FOR AUTOMOBILES, &c.

1,370,701.

Specification of Letters Patent.

Patented Mar. 8, 1921.

Application filed June 14, 1920. Serial No. 388,837.

*To all whom it may concern:*

Be it known that I, LEONARD MORDANO, a subject of the Sultan of Morocco, (having declared his intention of becoming a citizen of the United States,) and a resident of the borough of Manhattan, city, county, and State of New York, have invented certain new and useful Improvements in Differential Gearing for Automobiles, &c., of which the following is a specification.

Although applicable to other purposes, my improvements are designed primarily for use in the type of differential mechanism used in connection with, and practically interposed between, the abutting inner ends of the sections of rear driving shafts of automobiles in a manner, and for reasons well known in the art,—the invention relating more particularly to the means whereby I attain and maintain a constant uniform contactual mesh and engagement between the intermediatory pinions and the shaft gears, and a distinguishing feature being the provision of split conoidal locking members by which the adjustable bearing sleeves for the said intermediatory pinions are effectually and positively locked in prescribed position, as hereinafter set forth.

In the accompanying drawings,

Fig. 3, is a similar view with the shaft ends indicated only by dotted lines, the gearing and spider arms being shown in elevation;

Fig. 4, is a transverse sectional elevation through Fig. 1, the gearing being omitted;

Fig. 5, is a perspective view of one of my conoidal locking members.

The housing or incasement, as heretofore, is made in two sections E, E', secured together by screw studs $e, e$, and nuts $e', e'$. D, D', represent the abutting inner ends of the rear drive shaft, journaled respectively in the adjustable sleeves S, S', which are screw mounted respectively in the sections E, E', of the housing, as shown more particularly in Figs. 2 and 3, of the drawings.

Figure 2:
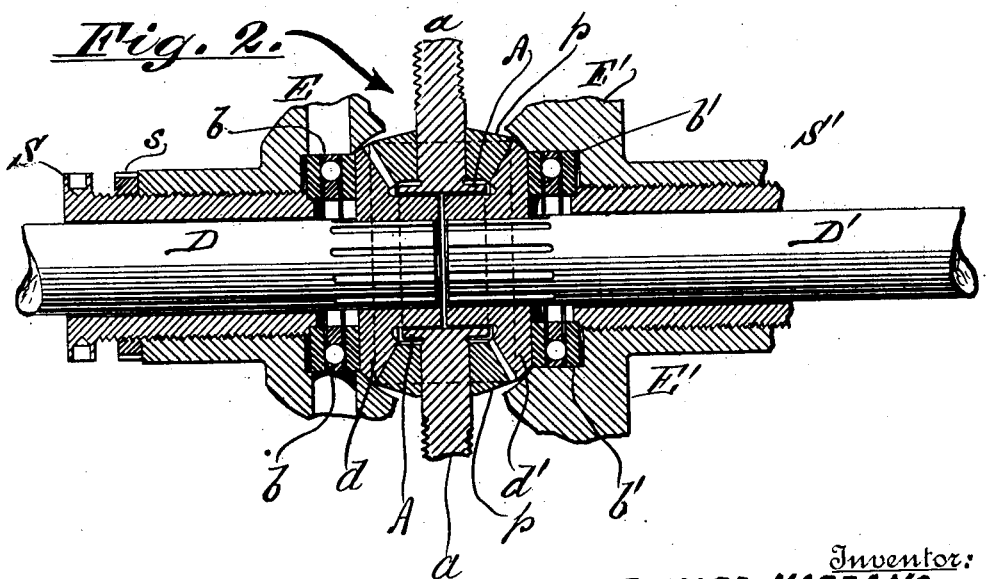
Fig. 2, is a central longitudinal sectional elevation thereof, the incasement being broken away in part.

On said inner ends of the shaft sections D, D', are spline-mounted the miter gears $d$, $d'$, as shown in Fig. 2, anti-friction thrust bearings $b, b'$, being interposed between the backs of said miter gears $d, d'$, and the inner ends of the aforesaid adjustable bearing sleeves S, S', which latter are locked in prescribed position by nuts $s, s'$.

Figure 1:
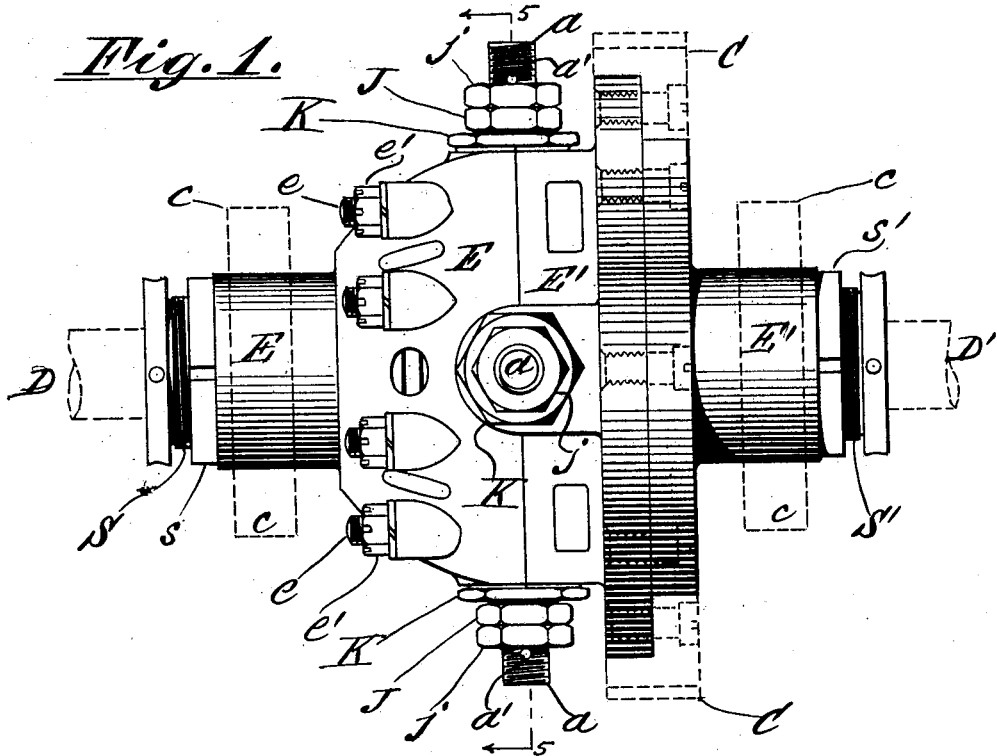
Figure 1, is an external view of the essential parts of my improved differential mechanism.

The dotted lines C, in Figs. 1 and 3, represent the usual crown gear bolted to the incasement section E'; and the dotted lines $c$, $c$, (same figures) the usual bearings in which the housing E, E', as a unitary structure, is rotatably mounted.

A, is the annular central base of the medial axial spider formed with the radial studs $a$, $a$, on which the compensating pinions $p, p$, are rotatably mounted adjacent to said annular base A,—the portions of said axis studs $a, a$, next the base A, being left unthreaded for the purpose, while the outer portions of said axis studs are screw threaded for engagement each with an internally threaded adjustment sleeve J, and lock nut $j$, as shown more particularly in Fig. 3.

Interposed between the inner end of each adjustment sleeve J, and each pinion $p, p$, is an anti-friction thrust bearing $j'$, the pressure exerted upon which by the adjustment sleeve J, governs the character of the mesh between the teeth of said pinion $p$, and those of the shaft miter gears $d, d'$. The outer ends of the adjustment sleeves J, J, are polygonally headed for engagement with a wrench or equivalent implement; and the axis studs $a, a$, near their outer extremities are preferably formed with holes $a', a'$, for the insertion of cotter pins which may be used to retain the lock nuts $j$, in position.

Besides being threaded internally as before stated for engagement with the threaded portions of the axis studs $a, a$, the adjustment sleeves J, J, are screw threaded externally for engagement each with the internal thread of a conoidal wedge member K,—each of said conoidal wedges being seated in a concavo-conoidal seat formed for the purpose in and between the opposed faces of the housing sections E, E', as shown more particularly in Figs. 3 and 4. The outer extremity of each of these conoidal wedges K, K, is formed with a continuous polygonal head $k$, for tool manipulation, and with a plurality of splits $k'$, which divide the conoidal body into a series of gripping jaws $k^2$, as shown more particularly in Fig. 5, so that when the wedge K, is screwed down tight on its concavo-conoidal seat it will positively clamp the inner portion of the adjustment sleeve J, with which it is in engagement in such manner as to prevent the possibility of the turning of the latter. Hence the back pressure of the pinion *p*, against the thrust bearing *j'*, is effectually counteracted, and the prescribed adjustment maintained, because the adjustment sleeve J, becomes temporarily at least, to all intents and purposes, a component part of the rigid axis stud *a*, itself.

By this means I am enabled not only to attain a perfectly accurate initial adjustment of the intermeshing gears with relation to each other, but also to compensate for wear, and maintain at all times a constant and effective coördination of parts, thereby insuring continuity of service under uniform conditions, and materially increasing the life and usefulness of the differential mechanism considered in a unitary sense. Furthermore, by the use of my specific means of attaining and maintaining accuracy of adjustment of the intermediate pinions with relation to the shaft gears, the cost of production may be materially reduced, because I obviate the necessity for accurate gear grinding and finish which can only be accomplished by the employment of expensive skilled labor.

What I claim as my invention and desire to secure by Letters Patent is,

1. In combination with differential mechanism of the character designated, the combination with an axis stud and intermediate pinions loosely mounted thereon, of the means herein set forth for effecting the individual adjustment of each intermediate pinion mounted loosely on said axis stud of a medial axial spider member, comprising a thrust bearing, an adjustment sleeve in screw threaded engagement with said axis stud, and a split conoidal clamping wedge in screw-threaded engagement with said adjustment sleeve and positioned in a concavo-conoidal seat formed for the purpose in the housing.

2. In combination with differential mechanism of the character designated embodying drive shaft sections, gears on the inner ends thereof, and intermeshing intermediate pinions, the means herein set forth of effecting the individual adjustment of each of the gears on the inner ends of the drive shaft sections with relation to the meshing intermediate pinions, comprising, for each of said shaft gears, a thrust bearing, an adjustment shaft bearing sleeve screw mounted in the casing and contacting with said thrust bearing, and means for locking said adjustable shaft bearing sleeve in prescribed position, together with said meshing intermediate pinions, for the purpose described.

3. In combination with differential mechanism of the character designated embodying drive shaft sections, gears on the inner ends thereof, and intermeshing intermediate pinions, the means herein set forth of effecting the individual adjustment of each of the gears on the inner ends of the drive shaft sections with relation to the meshing intermediate pinions, comprising, for each of said shaft gears, a thrust bearing, an adjustable shaft bearing sleeve screw mounted in the casing and contacting with said thrust bearing, and means for locking said adjustment shaft bearing sleeve in prescribed position, together with said meshing intermediate pinions, and with means for adjusting said intermediate pinions with relation to said shaft gears, for the purpose described.

4. In combination with differential mechanism embodying a medial axis spider member, an axis stud, pinions loosely mounted on said stud, an adjustment sleeve coöperating with said stud, and a clamping member in engagement with said sleeve and positioned in a seat to clamp said sleeve to said stud.

LEONARD MORDANO.

Witnesses:
 GEO. WM. MIATT,
 DOROTHY MIATT.